United States Patent Office 3,450,147
Patented June 17, 1969

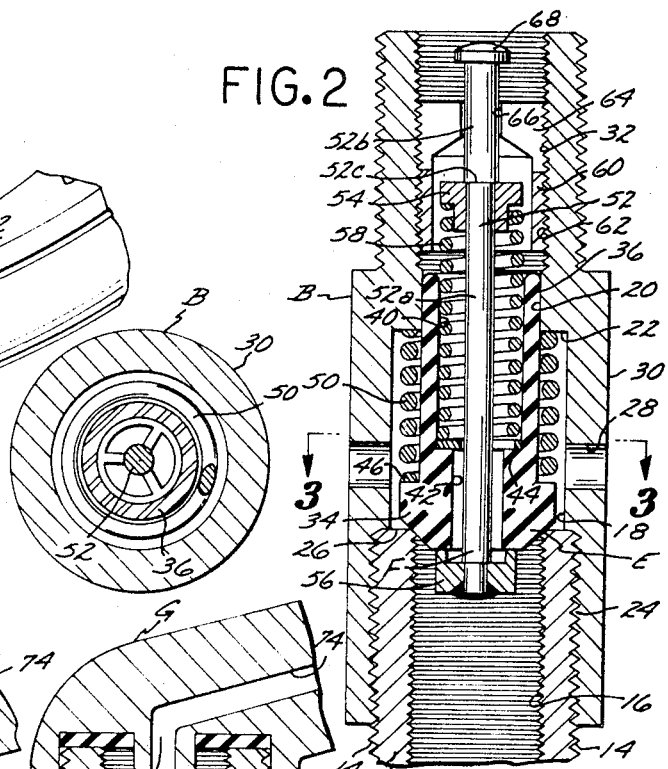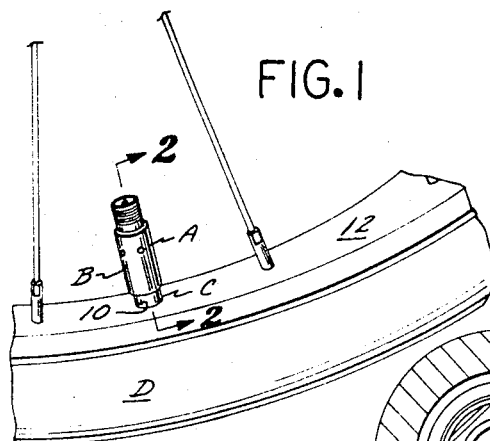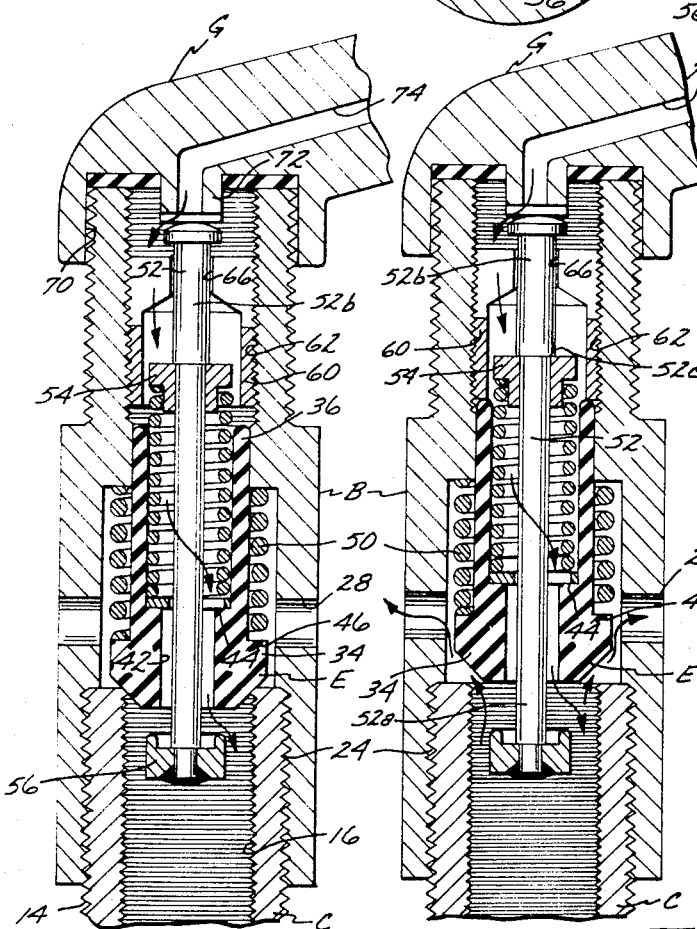
FIG. 1
FIG. 2
FIG. 3
FIG. 4
FIG. 5
FIG. 6
INVENTOR.
DONALD A. WEBB

1

3,450,147
PRESSURE-LIMITING DEVICE FOR TIRES
Donald A. Webb, 7723 Hosford Ave.,
Los Angeles, Calif. 90045
Filed Nov. 29, 1966, Ser. No. 597,691
Int. Cl. F16k 15/20
U.S. Cl. 137—226                          5 Claims

ABSTRACT OF THE DISCLOSURE

A device for mounting on the tubular valve stem of a pneumatic-tired vehicle which permits inflation of the tire with air, and discharges surplus air from the tire after a predetermined pressure has been reached.

---

Although many service stations provide facilities for inflating tires by injection of air under pressure, and these facilities frequently include a pressure gauge, but due to constant use are notoriously unreliable, and it is not uncommon to find that one or more tires have been substantially over or under inflated, with a resultant adverse effect on the life thereof. Also, when tires of small volume are inflated in the manner described, one of the tires often blows out, because of the relatively short length of time required to inflate such a tire.

A major object of the present invention is to provide a simple, inexpensive device that can be fabricated from standard, commercially available materials, which may be either included as an integral part of a valve stem, or seprately used as an accessory that may be removably mounted thereon, to limit the pressure to which the tire can be inflated.

Another object of the invention is to supply a device that is easily installed on the valve stem of a tire to assure that the air pressure in the tire is at a substantially desired level, whereby the mileage attainable from a tire is substantially increased.

These and other objects and advantages of the invention will become apparent from the following description of first and second forms thereof, and from the accompanying drawing illustrating the same, in which:

FIGURE 1 is a perspective view of a first form of pressure-limiting device removably mounted on the valve stem of a bicycle tire;

FIGURE 2 is a longitudinal cross-sectional view of the device mounted in a first position which seals the interior of the tire against the ambient atomsphere;

FIGURE 3 is a transverse cross-sectional view of the device, taken on line 3—3 of FIGURE 2;

FIGURE 4 is a longitudinal cross-sectional view of the first form of the device when in a second position to fill a tire with air;

FIGURE 5 is a longitudinal cross-sectional view of the first form of the device in a third position which permits discharge of excess air in a tire; and FIGURE 6 is a longitudinal cross-sectional view of a second form of the device.

With continuing reference to the drawing for the general arrangement of the first form of the device A, it will be seen in FIGURE 1 to include a tubular body B

2 that is removably mounted on a valve stem C projecting outwardly from a pneumatic tire D. Valve stem C, as is conventional with such devices, projects through an opening 10 formed in a rim 12 on which the tire D is mounted.

As may best be seen in FIGURE 2, the valve stem C is of tubular structure and external threads 14 and internal threads 16 are formed on the outer end portion thereof. The tubular body B (FIGURES 2 and 3) is circular in transverse cross section and includes a longitudinally extending bore 18 and a counter-bore 20, which jointly define a first circumferentially extending body shoulder 22. Threads 24 are defined on a part of the surface of bore 18 which engage the external threads 14 formed on the valve stem C. The outer extremity of valve stem C defines a circumferentially extending surface 26 as may be seen in FIGURE 2. One or more transverse air discharge ports 28 are formed in the side wall portion 30 of body B. Threads 32 are provided on the outer portion of the bore 20.

A poppet valve E formed from a resilient material such as rubber, a polymerized resin, or the like, is provided that is longitudinally movable within the confines of body B. Valve E includes a head 34 from which a cylindrical wall 36 extends outwardly. Wall 36 is slidably mounted in the unthreaded part of counter-bore 20. A bore 40 and counter-bore 42 extend longitudinally through valve E, and at the junction of these bores an inwardly extending circular body shoulder 44 is defined. Also, at the junction of the head 34 and portion 36 a second shoulder 46 is defined.

The head 34 of poppet valve E is at all times urged inwardly into sealing engagement with the surface 26 of valve stem C, by a compressed helical spring 50 disposed in bore 18 of body B, with one end of the spring abutting against the first body shoulder 22 and the opposite end of the spring against the second shoulder 46. It will be apparent that when the poppet valve E is in the first position (FIGURE 2), communication between the interior of the tire D through the valve stem C to the ambient atmosphere is obstructed.

A first spring-loaded valve assembly F is operatively associated with the poppet valve E. Assembly F includes an elongate shaft 52, the inner portion of which is identified by the numeral 52a, and the outer portion thereof as 52b, with the latter being larger in transverse cross section than the inner portion. The junction of the two sections 52a and 52b defines a third circumferentially extending body shoulder 52c. The shaft sections 52a and 52b are substantially smaller in transverse cross section than that of the bore 40 and counter-bore 42 in poppet valve E. A ring-shaped stop 54 is mounted on shaft 52 and abuts against the shoulder 52c, as seen in FIGURE 2.

A valve member 56 is mounted on the inner end of shaft portion 52a by conventional means, and this valve member is substantially greater in transverse cross section than that of the counter-bore 42 formed in the poppet valve E. A second compressed helical spring 58 is disposed within the confines of the body B, with the outer end of this spring abutting against the stop 54, and the inner end thereof against the body shoulder 44. Spring 58 at all times tends to urge the shaft 52 outwardly to maintain the valve member 56 in sealing contact with the inner end of the poppet valve E in a first position, as shown in FIGURE 2.

A plug 60 is provided, on the inner portion of which threads 62 are formed that removably engage the threads 32, and permit the plug to be disposed in a predetermined longitudinal position relative the body B. Plug 60 has a narrow bridge 64 extending outwardly therefrom in which a longitudinally extending opening 66 is defined that slidably engages the shaft portion 52b to assist in slidably maintaining the shaft 52 in a longitudinally extending, centered position within the confines of the body B. The outer end of shaft 52 terminates in a small head 68.

A conventional air-filling member G, such as illustrated in FIGURES 4 and 5, is brought into engagement with the outer end of body B, with the outer portion of the body being situated within the confines of a recess 70 formed in the filling member. Filling member G is provided with a protuberance 72 located within the cavity 70 and forcibly engages the head 68, whereby the shaft 52 and valve member 56 are moved to second positions, as shown in FIGURE 4. Air under pressure can thereafter be injected into a tire through a bore 74 formed in the filling member G, and pass downwardly through the tubular body B to enter the valve stem C as indicated by arrows in FIGURE 4.

It should be particularly noted that when the poppet valve E remains in the position shown in FIGURE 4, no air can discharge from the valve stem C through the ports 28 into the ambient atmosphere. However, when air pressure in the tire D exceeds a predetermined magnitude, a sufficient outwardly directed force is exerted on the inner end of the poppet valve E, to further compress the spring 50 and permit the valve E to move outwardly in the manner shown in FIGURE 5. Air from the valve stem C when the poppet valve E is in the position shown in FIGURE 5, flows between the surface 26 and inner surface of valve E into the bore 18, and passes from this bore through the ports 28 to the ambient atmosphere. When excess air is discharged from the ports 28 to the extent that air in the tire D is not greater than the previously mentioned predetermined value, the spring 50 expands, and in so doing, moves the poppet valve E from the position shown in FIGURE 5 to that shown in FIGURES 2 and 4.

The second form H of the invention, as shown in FIGURE 6, differs chiefly from the first form A thereof in that the tubular body B is formed as an integral part of a valve stem J. Valve stem J is fabricated of a resilient material, and is of the type that snaps into an opening in the rim of a vehicle on which a tubeless tire (not shown) is mounted. The stem J includes a tubular body 76 in which a longitudinally extending bore 78 is formed that is in communication with the interior of the tubeless tire (not shown). Bore 78 communicates with an enlarged confined space 80 in the body 76, which space is defined by an outer circumferentially extending body shoulder 82, a lower body shoulder 84, and a cylindrical surface 86 extending therebetween. The stem J is provided with a bore 88 extending therethrough that is in communication with space 80. Bore 88 has threads 90 formed on the interior outer portions thereof respectively. The threads 90 are engaged by a plug 60' of the same structure as that of plug 60 previously described.

The second form H of the invention also includes a poppet valve E' and all of the other elements associated with the poppet valve previously described in connection with the first form of the invention A. Inasmuch as these elements have been previously described, the same identifying numerals have been used in referring thereto in the drawing as used in connection with the first form of the invention, but to which primes have been added.

The second form H of the invention includes a compressed helical spring 50', the outer end of which is in abutting contact with the shoulder 22', with the inner end of the spring abutting against the shoulder 46' defined on the poppet valve E'. Spring 50' at all times tends to maintain the poppet valve E' in sealing engagement with the shoulder 84. One or more transverse ports 92 extend transversely through the wall of valve stem J to maintain communication between the ambient atmosphere and the confined space 80.

When the second form H is employed, the air inlet protuberance 72 moves the shaft 52' inwardly to separate the valve member 56' from poppet valve E', whereby air flows into the tubeless tire (not shown). Should the air pressure in the tubeless tire exceed a predetermined maximum value, the air causes the poppet valve E' to move outwardly, which permits excess air to escape through the bore 78 and the ports 92 into the ambient atmosphere. After discharge of excess air to the extent that the air pressure in the tubeless tire (not shown) is at a predetermined value, the compression on spring 50' moves the poppet valve E' inwardly to seal against the shoulder 84. Obviously, when the air inlet is removed from the outer end of valve stem J, the spring-loading on the shaft 52' returns the valve member 56' into a sealing position on the poppet valve E'.

The use and operation of the first and second forms of the invention have been described in detail and need not be repeated.

I claim:
1. In a device of the type that is mounted on the tubular valve stem of a pneumatic-tired vehicle and remains in place thereon to permit inflation of the tire and limitation of the pressure to which the tire can be inflated, which device includes an elongate rigid tubular body removably mounted on said valve stem and with an outer end thereof being adapted to be removably engaged by an air-discharge fitting, which body is formed with at least one transverse port therein that is in communication with the interior of said body and the ambient atmosphere, the improvement for inflating said tire and limiting the air pressure therein, including:
   (a) a resilient poppet valve body through which a bore extends longitudinally, with said valve body having a frusto conical lower end that sealingly engages the outer end of said valve stem inwardly from said port and one poppet valve body disposed in said tubular body;
   (b) first deformed spring means in said tubular body that at all times urge said poppet valve body into sealing engagement with the outer end of said tubular valve stem inwardly from said port, which spring means permits outward movement of said poppet valve body to permit escape of surplus air from said tire through said bore when the air pressure in said tire exceeds a predetermined magnitude;
   (c) a shaft of smaller transverse cross section than that of said bore longitudinally disposed therein;
   (d) second spring means that at all times tend to move said shaft outwardly relative to said poppet valve body; and
   (e) a second rigid valve member on the inner end of said shaft which seals with the inner end of said poppet valve body except when said shaft is moved inwardly by said air-discharge fitting during the discharge of air into said tire, with said poppet valve body serving the dual function of permitting escape of surplus air at an excessive pressure from said tire through said port and as a seat for said rigid valve member.

2. A device as defined in claim 1, wherein said valve stem has external threads formed on the outer end thereof, and said body is provided with internal threads that removably engage said threads on said stem to support said body on said stem.

3. A device as defined in claim 1, wherein said body is formed with a longitudinally extending bore and counter-bore, at the junction of which bore and counter-bore a first body shoulder is defined, with said poppet valve including a first cylindrical portion slidably mounted in said counter-bore and also including a second body shoulder at the inner end of said cylindrical portion thereof, and with said first spring means comprising a compressed spring disposed in said bore and in abutting contact with said first and second shoulders.

4. A device as defined in claim 1, which further includes:
(i) a guide plug mounted at a fixed position in said bore in said tubular body and slidably engaged by said shaft, in which plug at least one air passage is formed that extends longitudinally therethrough.

5. A device as defined in claim 4, wherein internal threads are formed in said bore in said body, and said plug has external threads thereon that engage said threads in said bore to permit longitudinal adjustment of said plug to a desired position in said body.

References Cited

UNITED STATES PATENTS

| | | | |
|---|---|---|---|
| 1,156,328 | 10/1915 | Thayer | 137—226 |
| 1,269,694 | 6/1918 | Faires | 137—226 |
| 1,434,708 | 11/1922 | Kelsey | 137—226 |
| 1,724,063 | 8/1929 | Anderson | 137—226 X |
| 1,738,621 | 10/1929 | Washington | 137—226 |
| 1,772,107 | 8/1930 | Nelson | 137—226 |
| 1,857,382 | 5/1932 | Ingram | 137—226 |
| 1,934,572 | 11/1933 | Sutton | 137—226 |
| 2,690,757 | 10/1954 | Orchowski | 137—226 |
| 2,954,796 | 10/1960 | Marshall | 137—226 |

JOHN PETRAKES, *Primary Examiner.*

U.S. Cl. X.R.

137—230